United States Patent [19]

Siol et al.

[11] Patent Number: 4,849,479

[45] Date of Patent: Jul. 18, 1989

[54] COMPATIBLE POLYMER BLENDS

[75] Inventors: Werner Siol, Darmstadt; Ulrich Terbrack, Reinheim, both of Fed. Rep. of Germany

[73] Assignee: Röhm GmbH Chemicsche Fabrik, Darmstadt, Fed. Rep. of Germany

[21] Appl. No.: 96,475

[22] Filed: Sep. 15, 1987

[30] Foreign Application Priority Data

Sep. 24, 1986 [DE] Fed. Rep. of Germany ....... 3632370

[51] Int. Cl.$^4$ ...................... C08L 33/10; C08L 33/08
[52] U.S. Cl. .................................. 525/216; 525/227; 525/228
[58] Field of Search ............... 525/216, 219, 227, 241, 525/228

[56] References Cited

U.S. PATENT DOCUMENTS

| | | |
|---|---|---|
| 3,253,060 | 5/1966 | Koblitz et al. |
| 3,458,391 | 7/1969 | Miller, Jr. |
| 3,459,843 | 8/1969 | Fischler |
| 4,042,648 | 8/1977 | Kitamura ............................. 525/216 |
| 4,558,098 | 12/1985 | Kamata ............................. 525/207 |
| 4,714,507 | 12/1987 | Ohgushi ............................. 428/63 |

FOREIGN PATENT DOCUMENTS 1020162 2/1966 United Kingdom ................ 525/216

OTHER PUBLICATIONS

S. H. Goh, Miscibility of Poly(methylstyrene-10-acrylonitrile) with Polyacrylates, Jan. 1982, Poly. Eng. Sci., 34–39.

Primary Examiner—John C. Bleutge
Assistant Examiner—David Buttner
Attorney, Agent, or Firm—Oblon, Spivak, McClelland, Maier & Neustadt

[57] ABSTRACT

Compatible polymer mixtures of a polymer component which contains cyclohexyl (meth)acrylate as a monomer and a polymer component which contains α-methyl styrene as a monomer.

10 Claims, No Drawings

COMPATIBLE POLYMER BLENDS

BACKGROUND OF THE INVENTION

1. Field of the Invention

The invention concerns compatible polymer blends of a polymer component which contains cyclohexyl (meth)acrylate as the monomer and a polymer component which contains α-methyl styrene as the monomer.

2. Discussion of the Background

As a rule, different polymer species are considered to be incompatible with one another, i.e. different polymer species generally do not form a homogeneous phase, which would be characterized by complete miscibility of the components, down to slight proportions of a component. Certain exceptions to this rule have caused increasing interest, particularly among the experts concerned with the theoretical interpretation of the phenomena.

Completely compatible mixtures of polymers demonstrate complete solubility (miscibility) in all mixture ratios. As evidence of the miscibility, the glass temperature Tg or the so-called "optical method" (clarity of a film poured from a homogeneous solution of the polymer mixture) is often used as a reference. (See Brandrup-Immergut, Polymer Handbook, 2nd edition, III, 211-213).

As a further test for the miscibility of polymers which are different from one another, the occurrence of the lower critical solution temperature (LCST) is used. (See DE-A No. 34 36 476.5 and DE-A No. 34 36 477.3). The occurrence of the LCST is based on the process which occurs during warming, where the polymer mixture, which has been clear and homogeneous until then, separates into phases and becomes optically cloudy to opaque. This behavior is a clear indication, according to the literature, that the original polymer mixture had consisted of a single homogeneous phase which was in equilibrium. Examples of existing miscibility are represented, for example, by the systems polyvinyl fluoride with polymethyl methacrylate (PMMA) or with polyethyl methacrylate. (U.S. Pat. Nos. 3,253,060; 3,458,391 and 3,459,843). Recent results concerning "polymer blends" and possible applications for them were reported by L. M. Robeson in *Polym. Engineering & Science*, 24 (8), 587-597 (1984).

Copolymers of α-methyl styrene, maleic acid anhydride, as well as of α-methyl styrene and acrylonitrile are compatible with polymethyl methacrylate under certain conditions. Compatibility is also found in certain binary and ternary systems of copolymers of acrylonitrile with vinyl acetate and α-methyl styrene (C. Vasile et al., Chem. Abstr. 90: 39511a). Compatibility of copolymers of α-methyl styrene and acrylonitrile also exists with polymethyl methacrylate. In contrast, poly-n-propyl methacrylate, poly-isopropyl methacrylate and polycyclohexyl methacrylate are not compatible even with copolymers of α-methyl styrene and acrylonitrile (See S. H. Goh et al., *Polymer Engineering and Science*, 22, 34 (1982)).

This means that copolymers of α-methyl styrene and maleic acid anhydride and copolymers of α-methyl styrene and acrylonitrile demonstrate behavior similar to copolymers of styrene and maleic acid anhydride and copolymers of styrene and acrylonitrile. While copolymers of styrene and a highly polar monomer (e.g. acrylonitrile, maleic acid anhydride) are compatible with PMMA under certain conditions (e.g. copolymer composition), this is not the case for polystyrene itself.

For example, M. T. Shaw and R. H. Somani indicate the miscibility of PMMA with polystyrene as being only 3.4 ppm (PMMA with a molecular weight of 160,000) or 7.5 ppm (PMMA with a molecular weight of 75,000). See *Adv. Chem. Ser.* 1984, 206; *Polymer Blends Compos. Multiphase Syst.*, 33-42, Chem. Abstr. 101:73 417e. Other polymethacrylates and polyacrylates similarly do not form transparent polymer blends with polystyrene. This is true, e.g., for polyethyl acrylate, polybutyl acrylate, polyisobutyl methacrylate, polyhexyl methacrylate See R. H. Somani and M. T. Shaw, *Macromolecules*, 14, 1549-1554 (1981).

Mixtures of poly -α-methyl styrene and poly(meth)acrylates behave in a similar manner. For example, according to W. A. Kruse et al, Makromol. Chem. 177, 1149-1160 (1976), polymethyl methacrylate cannot be mixed with poly -α-methyl styrene with molecular dispersion.

Our own experiments show that poly -α-methyl styrene demonstrates compatibility with polymethyl acrylate and polymethyl methacrylate at room temperature. When heated to approximately 130° C., however, demixing occurs. In other words, these polymer mixtures demonstrate LCST behavior (LCST=lower critical solution temperature). A certain, slight compatibility is also found with polybutyl methacrylate. Here, the LCST is approximately 80° C. in the mixture example studied. This therefore indicates that the compatibility decreases with an increasing chain length of the ester groups, as was also described for the polymer mixtures: copolymers of α-methyl styrene and acrylonitrile/-polymethyl acrylates. See S. H. Goh et al., *Polymer Engineering and Science*, 22, 34 (1982).

Mechanical mixtures of polymers (polyblends) have resulted in plastic products with improved properties in certain cases and in certain areas of the plastics industry (See Kirk-Othmer 3rd edition, Vol. 18, pp. 443-478, J. Wily, 1982). The physical properties of such "polyblends" generally represent a compromise, which can mean an overall improvement as compared with the properties of the individual polymers. In these situations, multi-phase polymer mixtures have achieved much greater commercial significance than compatible mixtures (See Kirk-Othmer, loc. cit., p. 449). Multiphase and compatible mixtures must therefore be kept strictly separate with regard to both their physical properties and their properties which are relevant for application technology, especially their optical properties (transparency, clarity, etc.). As already explained, a lack of compatibility often sets narrow limits for the goal of thereby achieving an improved overall spectrum of properties. This also appeared to apply to the two polymer classes of polystyrenes and polyalkyl (meth)acrylates. See W. A. Kruse et al., *Makromol. Chem.* 177, 1145 (1976) as well as R. H. Somani and M. T. Shaw, *Macromolecules* 14, 1549-54 (1981).

SUMMARY OF THE INVENTION

Accordingly, one object of the present invention is to provide compatible polymer blends with commercially useful properties.

A further object of the invention is to provide compatible polymer blends with useful properties comprised of a poly -α-methyl styrene polymer and a polycyclohexyl (meth)acrylate polymer.

These and other objects of the present invention which will become apparent from the following specification have been achieved by the present compatible polymer blends of two different polymers comprising:

(A) 1–99.9 wt. % of a poly -α-methyl styrene, comprising at least 20% and up to a 100% by weight of α-methyl styrene, * (Polymer P1) and
* (the balance to a 100% by weight being formed by monomers copolymerizable with α-methyl styrene)

(B) 99–0.1 wt. % of a polymer comprising at least 2% and up to a 100% by weight of a monomer with the formula (I)

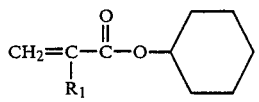  (I)

wherein $R_1$ is hydrogen or methyl ** (Polymer P2).
** (the balance to a 100% by weight being formed by monomers co-polymerizable with the monomers of formula (I))

DETAILED DESCRIPTION OF THE PREFERRED EMBODIMENTS

It was now found that surprisingly, mixtures of poly -α-methyl styrene and polycyclohexyl methacrylate or polycyclohexyl acrylate are compatible with one another. The compatibility between polycyclohexyl (meth)acrylate and poly -α-methyl styrene is so good that the clear polymer mixtures can be heated to their decomposition point without de-mixing.

Preferably, the total of the polymer component (A) plus (B) comprises one hundred percent of the total polymers in the mixture. If necessary, additional polymers can be added, which are compatible with the mixture in the amounts added.

According to the present findings, the compatibility of the mixtures formed from (A) and (B) is so good that no de-mixing occurs at a temperature of 200° C. and above.

Polymer mixtures of poly -α-methyl styrene as polymer component (A) and polycyclohexyl acrylate and/or polycyclohexyl methacrylate as polymer component (B) are particularly preferred. The excellent compatibility of this polymer mixture allows an extensive range of variation, with regard to both the mixture ratio and the mixture partners. This makes it possible, on the one hand, to vary the polymer component (B) extensively by copolymerization with suitable monomers. On the other hand, the polymer component (A) can also be changed by copolymerization with suitable monomers, within a certain scope, without any loss of compatibility. Suitable comonomers for component (B) are acrylic acid esters and methacrylic acid esters, generally those of non-alicyclic alcohols with 1–12 carbon atoms, particularly alkanols. In addition, acrylic acid esters and methacrylic acid esters of optionally substituted cyclic alcohols with 4, 5, 7, 8, 9, 10, 11 or 12 carbon atoms in the ring, as well as acrylic acid esters and methacrylic acid esters of substituted cyclohexanols, with substituents being preferably alkyl groups with 1 to 3 carbon atoms are suitable.

Generally suitable comonomers are e.g. listed in Kunststoff-Handbuch, Vol. V, Ed. R. Vieweg & G. Daumüller, Carl Hanser Verlag, Munchen, 1969, pp. 104–108.

In addition, other monomers which can be copolymerized with cyclohexyl (meth)acrylate are possible comonomers, for example, optionally substituted styrenes, generally in a proportion of less than 50% by weight and preferably in a proportion of less than 20% by weight. Comonomers for polymer (B) which are particularly preferred are esters of (meth)acrylic acid which differ from cyclohexyl (meth)acrylate, particularly those with Formula II

  (II)

with $R_2$ standing for methyl, ethyl, propyl and n-butyl, i.e. methyl methacrylate, ethyl methacrylate, propyl methacrylate and n-butyl methacrylate. The porportion of these monomers in polymer P2 is preferably at least 40% by weight.

It is furthermore preferred that the proportion of cyclohexyl methacrylate and/or cyclohexyl acrylate in polymer P2 comprises at least 5% by weight. A content of at least 10% by weight is especially preferred, and a content of 20–80% by weight of said cyclohexyl esters in polymer P2 is very especially preferred. Furthermore, such polymer mixtures which contain at least 20% by weight of α-methyl styrene and at least 40% by weight of monomers with Formula II in polymer P1 are also preferred.

Polymer mixtures which contain, as polymer P1, copolymers which contain at least 1% by weight, generally 2–40% by weight, or even better, 3–20% by weight of a monomer with Formula III are preferred.

$$CH_2=CHR_3 \qquad \text{III}$$

with $R_3$ standing for an optionally substituted aromatic group, preferably a phenyl group or for a group having the formula below, where

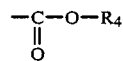

$R^4$ stands for an aliphatic or aromatic hydrocarbon group with 1–18 carbon atoms.

As substituents for aromatic groups alkyl groups with 1–4 carbon atoms or—to a lesser extent—halogen like chlorine should be named.

Of particular interest are those polymer mixtures which are composed of at least 20 wt. % α-methyl styrene and in addition, of a another styrene, different from α-methyl styrene, optionally a substituted styrene. Possible styrene which should be mentioned are styrene itself, p-alkyl and m-alkyl styrenes, with alkyl preferably standing for an alkyl group with 1–3 carbon atoms. Likewise, α-methyl styrene can be partially replaced by esters of acrylic acid and methacrylic acids. Preferred amounts for methacrylic acid esters are 10–80% by weight; if the methacrylic acid esters correspond to Formula II, then 40 to 80% by weight. Furthermore, the α-methyl styrene can be replaced by other vinyl compounds, particularly vinyl esters, in smaller amounts. Care should be taken in this regard that the content of α-methyl styrene in polymer component (A) comprises at least 20% by weight, preferably at least 30% by weight, and more preferably at least 40% by weight and even more preferably at least 55% by weight.

While the polymer component (A) can be the most extensively modified with other hydrophobic vinyl compounds, the proportion of highly polar monomers, such as, e.g., acrylonitrile, maleic acid anhydride, maleic acid imides, p-(2-hydroxyhexafluoroisopropyl) styrene or allyl alcohol is very limited. The proportion of these polar monomers should amount to less than 10% by weight, preferably, less than 5% by weight of the polystyrene component (A). Polymers (A) which contain less than 0.1% by weight of these polar monomers are especially preferred.

The variations are generally guided according to the requirements of the area of use. For example, the cyclohexyl acrylate and/or the cyclohexyl methacrylate content of a polymer (B) which is to be used in a high weight proportion, for example to modify the index of refraction of pure poly -α-methyl styrene, will be higher, generally greater than 20% by weight, or preferably greater than 30% by weight, than the cyclohexyl (meth)acrylate content of a polymer (B) which is only intended to be compatible with polymer (A) at room temperature, for example, but is supposed to demonstrate phase separation (in other words, incompatibility) again at higher temperatures.

As a rule, compatibility of polymers (A) with polymers (B) continues to exist even if polymer (A) also contains cyclohexyl (meth)acrylate and/or polymer (B) also contains α-methyl styrene. However, the content of α-methyl styrene in polymer (A) is clearly greater than the α-methyl styrene of polymer (B). As a rule, the difference in the α-methyl styrene content, i.e., the % by weight of α-methyl styrene in polymer (A) minus % by weight of α-methyl styrene in polymer (B), is greater than 10% by weight, preferably greater than 20% by weight, more preferably greater than 30% by weight, and even more preferably greater than 50% by weight. Also, the cyclohexyl (meth)acrylate content of polymers (B) is clearly greater than the cyclohexyl (meth)acrylate content of polymer (A). For example, polymer (A) generally contains less than 2% by weight of cyclohexyl (meth)acrylate, preferably less than 0.1% by weight. In cases where polymer (A) also contains cyclohexyl (meth)acrylate, the content of cyclohexyl (meth)acrylate in polymer (B)/content of cyclohexyl (meth)acrylate in polymer (A) is >2, preferably >5 and more preferably >10.

The content of monomers with Formula I in polymer P2 and the content of α-methyl styrene in polymer P1 can be low, particularly if the other monomer components in polymer P1 and in polymer P2 are very compatible.

The production of the polymer mixtures according to the invention as compatible mixtures takes place according to the known criteria (See Kirk-Othmer, loc. cit., Vol. 18, pp. 457–460).

(a) When using optical methods, a single index of refraction is observed in the polymer mixtures according to the invention, which lies between that of the two polymer components (A) and (B).

(b) The polymer mixtures possess a single glass transition temperature Tg which lies between that of the polymer components.

PRODUCTION OF THE POLYMERS (A) AND (B)

Production of the polymers (A) and (B) can take place according to the known rules of polymerization and according to known methods. The polymers of type (A) can be produced, for example, according to Houben-Weyl, Methoden der Organischen Chemie, 4th edition, Volume XIV/1, Georg Thieme Verlag (1961). They are also commercially available in a suitable form. Preferably, the radical polymerization method can be used, but also ionic polymerization methods can be used. The molecular weights of the polymers (A) used according to the invention are generally above 3,000, preferably in a range of 5,000–1,000,000, more preferably in a range of 20,000–500,000 (determination by light scattering).

It should be emphasized, however, that the molecular weights do not appear to have any critical influence on the suitability of a polymer as a component in the compatible polymer mixtures. This is true both for the homopolymers and the copolymers of type (A) and (B). For good compatibility of polymer P1 and polymer P2, the tacticity of the polymers has a certain significance. As a rule, polymer P2 with a low proportion of isotactic triads (such as one obtained by radical polymerization, for example) is preferred over polymers with a high isotactic proportion, such as one produced by special ionic polymerization.

The production of the homopolymers and/or copolymers (B) is carried out according to known methods. Even though production by anionic polymerization or group-transfer polymerization is possible (see O. W. Webster et al., *J. Am. Chem. Soc.*, 105, 5706 (1983)), the preferred form of production is radical polymerization.

The molecular weights of polymers (B) are generally above 3,000, in a general range of 10,000 to 1,000,000, preferably 20,000 to 300,000. For the selection of the monomer components which are to be used as comonomers for (B), care should be taken that the glass temperature Tg of the resulting polymer does not have a restrictive influence on the technical applicability of the total system. For the production of molded elements made from the polymer mixture, for example, at least one of the polymers P1 and P2 should demonstrate a glass temperature Tg >90° C., it is preferred for this application that the polymer mixture has a glass temperature Tg >90° C. This restriction applies preferably for the production of injection-molded, pressed or extruded objects made of the polymer mixture. Molded elements produced from the polymer mixture which have a Vicat softening temperature of >115° C., preferably >125° C. and more preferably >135° C., are preferred. Accordingly, molding materials which are accessible according to the German patent application No. P 36 12 773.6 are very particularly preferred. Here, the use of polymers rich in cyclohexyl acrylate particularly results in improved optical properties of the highly heat-resistant materials (see present Example 8 and 9). Particularly with regard to good processability, it is generally necessary for the polymer mixture to have good thermostability, characterized by the fact that the TD value is >260° C. or preferably >280° C. The TD value refers to that temperature at which the polymer sample suffers a weight loss of 2% at a heating rate of 5° C./min, in a vacuum. For other areas of application, for example for varnishes, for elastomers or for reversible thermotropic glazing (polymer mixture with clouding point when heated), in other words for an application in accordance with DE-A No. 34 36 477.3, however, those polymer mixtures are preferred which have a polymer component P2 with a glass temperature Tg <40° C. or preferably <20° C. The preferred area of application of these polymer mixtures which contain poly -α-methyl styrene is, however, to be found in the area of plastics which have high dimensional stability under heat.

PRODUCTION OF THE POLYMER BLENDS

The compatible mixtures can be produced by various methods, for example, they are produced by intensive mechanical mixing of the components (A) and (B) in the melt, in an extruder, etc.; or they can be produced out of a common solvent, as so-called "solution cast polyblends" (See Kirk-Othmer, "Encyclopedia of Chemical Technology", 3rd edition. Vol. 18, p. 443-478, J. Wiley, 1982). The method of procedure can be that polymer (A) is dissolved in the monomer mixture of the polymer (B) and subsequently polymer (B) is produced in the presence of polymer P1. Alternatively, polymer (A) can, of course, also be produced in the presence of polymer B. Also, the polymer mixture can be produced with the aid of common precipitating agents, i.e., common to the two components. There are no restrictions on the type of mixing.

The compatible mixtures can also contain other usual additives, such as softeners, lubricants, and stabilizers, if they do not have a detrimental effect on the miscibility of the components or the single-phase character of the mixtures. In general, their proportion in the mixtures is less than 20% by weight, preferably below 3% by weight.

Preferably, the procedure is as follows. Generally, mixtures of components (A) and (B) are produced first, with the starting materials most advantageously being solids, for example in the form of a bead polymer or a granulate, using slowly operating mixing systems such as drum, Free fall mixer, or double chamber-plowshare mixers. The slowly operating mixing systems cause mechanical mixing without eliminating the phase borders. (See Ullmann's Encyklopadie der Technischen Chemie, 4th edition, Volume 2, p. 282-311, Verlag Chemie.) Subsequently, thermoplastic treatment takes place, by homogeneous mixing in the melt, using mixing systems which can be heated, at the temperatures suited for mixing, e.g. 150° C. to 300° C., in kneaders or preferably extruders, e.g. single-screw or multiple-screw extruders, or, if necessary, in extruders with an oscillating screw and shear pins (e.g. in a BUSSCO kneader). Using this method, uniform granulates (e.g. hot chips, cubic granules or round granules) can be produced. The particle size of the granulates is in the range from 2 to 5 mm. Another simple method for producing polymer mixtures is mixing polymer dispersions containing polymer component (A) and polymer dispersions containing polymer component (B). These dispersion mixtures can be coagulated together, spray-dried together or extruded together in an extruder. Production of the polymer dispersions in each case is generally known (See Houben-Weyl loc. cit.)

The compatible polymer mixtures according to the invention especially demonstrate the following advantages, which make the corresponding technical application possibilities obvious, with "poly -α-methyl styrene" and "polycyclohexyl (meth)acrylate" each being listed to represent the possibilities in the category of polymers (A) and (B), respectively.

(1) First, the polymer mixtures—in contrast to mixtures of other poly(meth)acrylates and poly -α-methyl styrene—are compatible. That is, the polymer mixtures according to the invention are clear as glass in the non-pigmented state, in contrast to non-compatible poly -α-methyl styrene/poly(meth)-acrylate mixtures, that is they demonstrate no light scattering. i.e. as a rule, the haze is <10%. Those mixtures which are only compatible at room temperature, but demonstrate de-mixing when the temperature is increased, are also in accordance with the invention (LCST behavior).

(2) Mixtures of poly -α-methyl styrenes and polycyclohexyl (meth)acrylates demonstrate a low degree of water absorption, as do poly -α-methyl styrenes and polycyclohexyl acrylates and α- methacrylates themselves.

(3) Birefringence of the poly -α-methyl styrene can be reduced by mixing with polycyclohexyl (meth)acrylate.

(4) The refractive index of poly -α-methyl styrene can also be reduced by mixing with polycyclohexyl (meth)acrylate. For example, the refractive index of poly -α-methyl styrene can be changed in such a way by mixing with polycyclohexyl (meth)acrylate that the index of refraction of the poly -α-methyl styrene/polycyclohexyl (meth)acrylate can be adapted to the index of refraction of an embedded rubber phase. In this way, transparent, impact-resistant plastics can be obtained. The mixture ratio of polymers P1 to polymers P2 can generally be quite freely selected, because of the good compatibility of the two polymers.

While relatively large amounts of polycyclohexyl (meth)acrylate can be used in polymer P1 or polymer P2 to adapt the index of refraction, this is not necessary for other applications. Generally, the polymer mixture comprises 1-99.9% by weight polymer P1 and 99-0.1% by weight polymer P2; polymer mixtures which contain 10-99% by weight polymer P1 and correspondingly, 90-1% by weight polymer P2 are preferred, mixtures which contain 40 to 95% by weight polymer P1 and 60-5 by weight polymer P2 are especially preferred, and finally, the mixture ratio of 60-90% by weight polymer P1 and 40-10% by weight polymer P2 is very preferred.

(5) Polymer compositions which contain up to approximately 40-99% by weight, preferably 70-95% by weight of the polymer mixture and 60-1% by weight, preferably 30-5% by weight of an additional polymer P3, different from P1 and P2, are also particularly interesting. In these cases, polymer P3 is incompatible with polymer P1, P2 and with the mixture.

As a rule, the composition of the polymer mixture is selected in such a way that the index of refraction of polymer P3 agrees with the index of refraction of the mixture, generally, therefore, the following should apply at room temperature:

$$|n_{D,PM}{}^{25} - n_{D,P3}{}^{25}| < 0.1$$

As a rule, the polymer P3, which is incompatible with the polymer mixture, will have a Tg <20° C. and will be covalently bonded with at least one of the components of the polymer mixture, in other words with P1 or P2, at least partially. In addition, the polymer P3 can be cross-linked. Preferably, polymer P3 is polybutadiene or polyisoprene.

Polymer compositions composed of 40-99% by weight polymer mixture and 1-60% by weight P3 are characterized by an improved impact resistance as compared with the pure polymer mixture, particularly if P3 demonstrates a Tg <20° C.

(6) By sheathing poly -α-methyl styrene with polycyclohexyl (meth)acrylate, the production of an optical gradient fiber is possible:

The following data are obtained in this case:
Core: poly -α-methyl styrene, $n_D = 1.61$
Mantle: polycyclohexyl (meth)acrylate, $n_D = 1.51$ Generally, copolymers which contain polycyclohexyl (meth)acrylate will be used as the mantle if only because of the great brittleness of polycyclohexyl methacrylate—which causes the index of refraction of the mantle to be even lower.

Transition: continuous

Such fibers can be used as light conducting cables, for example.

(7) Objects made of poly -α-methyl styrene with a thin coating of polycyclohexyl (meth)acrylate, particularly of a polycyclohexyl (meth)acrylate with a UV absorber polymerized into it, are possible. In contrast to unsheathed polystyrene, such objects are resistant to weathering. The problem of re-use of heterogeneously coated plastic wastes, which is a serious problem otherwise, is eliminated since wastes can be recycled, because of the good compatibility. As a rule, the objects made of poly -α-methyl styrene or of the polymer mixture are produced by injection, pressing, extrusion, rolling or casting. The coating of polymer P2 is generally applied by varnishing or by co-extrusion. Particularly suitable objects are those that require great dimensional stability under heat, as well as with good weathering resistance, e.g. headlight diffusion panes.

(8) Plates of poly -α-methyl styrene with a coating of polycyclohexyl (meth)acrylate can be produced. Plates with such a structure have a light permeability which is approximately 2% improved as compared with untreated poly -α-methyl styrene plates. As a rule, plates with a coating of polycyclohexyl (meth)acrylate also demonstrate greater scratch resistance and improved corrosion resistance.

(9) Advantages with regard to processing technology result when using polymer mixtures of >90% by weight poly -α-methyl styrene and <10% by weight polycyclohexyl (meth)acrylate. In this case, the polycyclohexyl (meth)acrylate takes over the functions of a processing auxiliary agent for poly -α-methyl styrene, which is frequently thermally sensitive.

(10) Polymer mixtures which are characterized by the fact that polymer P1 and polymer P2 are relatively similar, with polymer P2, however, containing a certain proportion, e.g. 2–10% by weight of cyclohexyl acrylate, and polymer P1 containing a clearly lesser proportion, i.e. generally at least 2% by weight less, of cyclohexyl acrylate, also find particular interest. Such polymer mixtures can be simply produced by batch polymerization of monomer mixtures which contain α-methyl styrene, methyl methacrylate and cyclohexyl acrylate. Because of the different copolymerization parameters, a monomer mixture which is rich in cyclohexyl acrylate builds up during final polymerization, but this does not result in incompatibility with the polymer P1 which is rich in α-methyl styrene (as is the case with polymers rich in methylacrylate but rather in compatible, clear products (see Examples).

(11) Furthermore, cementation of poly -α-methyl styrene can be carried out with polymer P2 or advantageously, with monomer/initiator mixtures which contain cyclohexyl acrylate. Here, the high polymerization velocity of the acrylates can be combined with the good poly -α-methyl styrene compatibility.

The following examples are intended to illustrate the invention and particularly to show how the compatible polymer mixtures are used to obtain products with improved weathering resistance, better optical properties and better processing stability and are not intended to limit the invention in any way.

EXAMPLES

Determination of the VICAT softening temperature takes place according to DIN 53460. Determination of the reduced viscosity ($\eta$spec/c) is based on DIN 1342, DIN 51562 and DIN 7745. Determination of the light transmission can be carried out according to DIN 5036, unless otherwise specified. The cloudiness (haze) is indicated in % (ASTM D 1003).

EXAMPLE 1

Compatible Polymer Mixtures of Poly -α-Methyl Styrene (Polymer P1) and Polycyclohexyl (Meth)Acrylate (Polymer P2)

Production of Compatible Polymer Films from Organic Solution.

Poly-α-methyl styrene (molecular weight 50,000; supplier: Aldrich-Chemie GmbH, D-7924 Steinheim) was dissolved in toluene at 20% by weight. Likewise, a 20% solution of polycyclohexyl methacrylate ($\eta$spec/c=29 ml/g) in toluene was produced. The solutions are mixed in the ratios indicated in Table 1. Films are poured from these solutions, dried in a vacuum and subsequently evaluated visually. All mixtures resulted in clear, colorless films (see Table 1).

TABLE 1

| | Visual observation of poly-α-methyl styrene/polycyclohexyl methacrylate mixtures % by weight | | |
|---|---|---|---|
| Experiment number | % by weight poly-α-methyl styrene in the film | % by weight polycyclohexyl methacrylate | Optical evaluation of the dried film |
| 1a | 98 | 2 | + |
| 1b | 95 | 5 | + |
| 1c | 90 | 10 | + |
| 1d | 80 | 20 | + |
| 1e | 70 | 30 | + |
| 1f | 60 | 40 | + |
| 1g | 50 | 50 | + |
| 1h | 40 | 60 | + |
| 1i | 30 | 70 | + |
| 1j | 20 | 80 | + |
| 1k | 10 | 90 | + |
| 1l | 5 | 95 | + |
| 1m | 2 | 98 | + |

(+ = homogeneous, clear as glass)

EXAMPLE 2

Compatible Polymer Mixtures of Poly-α-Methyl Styrene (Polymer P1) and Polycyclohexyl Acrylate (Polymer P2)

Poly-α-methyl styrene (according to Example 1) was mixed with polycyclohexyl acrylate ($\eta$spec/c=23 ml/g) according to Example 1. Result: All polymer mixtures from 98/2 to 2/98 were completely compatible.

EXAMPLE 3

Testing of the Compatibility at Elevated Temperature

Selected samples of the compatible polymer mixtures obtained in Examples 1–2 (20/80, 50/50, 80/20) were heated on a heating plate. Result: The polymer mixtures were compatible up to the decomposition temperature of poly-α-methyl styrene. No de-mixing was observed.

EXAMPLES 4-6

Partial Compatibility of Poly-α-Methyl Styrene with Polymers Composed of Monomers with Formula II

EXAMPLE 4

Polymethyl methacrylate was dissolved in toluene as described in Example 1, and mixed with a 20% solution of poly-α-methyl styrene (molecular weight 50,000) in a 1/1 ratio. A clear polymer film was obtained. When the film was heated to approximately 120° C., de-mixing takes place.

EXAMPLE 5

Polyethyl methacrylate was mixed with poly-α-methyl styrene as in Example 4. A clear polymer film was obtained, which turned white when heated to approximately 120° C.

EXAMPLE 6

Polybutyl methacrylate was mixed with poly-α-methyl styrene as in Example 4. A clear polymer film was obtained, which turned white when heated to approximately 120° C.

EXAMPLE 7

Poly-α-methyl styrene (molecular weight 50,000) was mixed with a copolymer of 60% by weight methyl methacrylate and 40% by weight cyclohexyl methacrylate as in Example 1, in a 1/1 ratio. A clear polymer film was obtained, which did not demonstrate any de-mixing when heated up to the decomposition point.

EXAMPLE 8

Production of a molding mass with high dimensional stability under heat, with good transparency. In situ production of a compatible polymer mixture by using monomers with very different copolymerization parameters, especially production of a polymer rich in (poly)-α-methyl styrene (polymer P1) in the initial phase of polymerization and a polymer rich in cyclohexyl acrylate (polymer P2) in the final phase of polymerization.

The following were placed in a 4 l surface-ground reactor, under a protective gas atmosphere (argon):
2,000 g - g distilled water
5 g - g sodium salt of a mixture of tetradecane and hexadecane sulfonic acids
0.004 g - FeSO$_4$ The following were then emulsified with the above:
1,188 g - methyl methacrylate
540 g - α-methyl styrene
72 g - cyclohexyl acrylate
11 g - 2-ethylhexyl thioglycolate The reaction was started with 0.45 g potassium peroxide disulfate and 0.18 g sodium bisulfite and polymerization was carried out at 80° C. The addition of initiator was repeated as necessary. Also, additional emulsifier can be added to stabilize the dispersion. Reaction time: approximately 10 h at 80° C., then slow cooling to room temperature. The polymer solid was obtained by freezing coagulation and subsequent suctioning and washing with distilled water. A molding material was obtained, from which a plate which was clear as glass was injection-molded.
Vicat softening temperature: 136° C.
Haze: 1.8%
Thermostability: TD =295° C.

EXAMPLE 9

Comparison Example

The same procedure as in Example 8 was carried out, but a different composition was selected:
1,188 g - methyl methacrylate
540 g - α-methyl styrene
72 g - methyl acrylate
11 g - 2-ethylhexyl thioglycolate When using the same procedure as in Example 8, a cloudy molding mass (haze >12%) was obtained, which was also clearly inferior to the polymer mixture according to Example 8 with regard to the Vicat softening temperature.

EXAMPLE 10

A plate with a thickness of 3 mm was extruded from the clear molding mass with high dimensional stability under heat as obtained in Example 8. A layer of a copolymer (polymer P2) with the composition 60% methyl methacrylate, 35% cyclohexyl methacrylate, 5% methyl acrylate, with an additive of 0.05% 2-hydroxy-4-octoxybenzophenone as a UV absorber, with a thickness of 10 μm, was varnished onto this plate.

A clear plate resulted, which demonstrated approximately 1% greater light permeability as compared with the non-varnished plate. The plate demonstrated improved weathering resistance.

EXAMPLE 11

Re-Working of Wastes Into the Process

A molding mass according to Example 8 was mixed at 20% by weight with ground plate wastes of the coated plate sections according to Example 10. This mixture was extruded to form clear plates with a thickness of 3 mm. The plates were varnished as described in Example 10. The properties of the plates obtained in this way correspond to the plate obtained according to Example 10.

The examples prove the extraordinarily good compatibility of poly-α-methyl styrene with polycyclohexyl (meth)acrylate. The good compatibility makes it possible not only to produce compatible mixtures of pure poly-α-methyl styrene and pure polycyclohexyl (meth)acrylate, but also compatible mixtures of modified poly-α-methyl styrene and other polymers (especially poly(meth)acrylates), which are only slightly modified with cyclohexyl (meth)acrylate.

This is all the more important since pure polycyclohexyl (meth)acrylate does not demonstrate any good mechanical properties. For cost reasons alone, the cyclohexyl (meth)acrylate content of polymer P2 should be kept as low as possible. This results from the fact that one of the most interesting areas of application according to the invention is specifically surface protection of poly-α-methyl styrene or poly-α-methyl styrene copolymers, for example by varnishing with polymer P2. Here specifically, minimal amounts of polymer P2, for example 0.5% by weight relative to polymer P1, are sufficient, so that only very small amounts of polymer P1 have to be recycled during re-processing.

As a rule, pure poly-α-methyl styrene will also not be used as polymer P1, since it is generally not thermostable without copolymerization with other monomers. Therefore, in addition to weathering protection of polymer P1 by polymer P2, the use of polymer P2 as a processing auxiliary agent for polymer P1 is of interest.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A miscible polymer blend, comprising:
   (i) 1–99.9 wt. % of a first polymer comprising a poly-alpha-methylstyrene, said poly-alpha-methylstyrene consisting of at least 20 wt. % alpha-methylstyrene, 40–80 wt. % of a monomer having the formula II

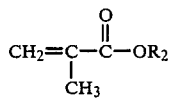

wherein $R_2$ is methyl, ethyl, propyl or n-butyl, and less than 0.1 wt. % of polar monomers; and
   (ii) 99–0.1 wt. % of a second polymer comprising at least 2 wt. % of a monomer having formula I

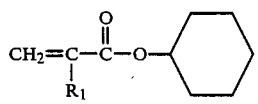

wherein $R_1$ is hydrogen or methyl, and at least 40 wt. % of at least one monomer having formula II.

2. The miscible polymer blend of claim 1, wherein said second polymer comprises at least 5% by weight of at least one monomer with formula (I).

3. The miscible polymer blend of claim 1, wherein said second polymer comprises at least 10% by weight of at least one monomer with formula (I).

4. The miscible polymer blend of claim 1, wherein said polymer blend has a Vicat softening temperature of >115° C.

5. The miscible polymer blend of claim 1, wherein said polymer blend has a Vicat softening temperature of >125° C.

6. The miscible polymer blend of claim 1, wherein said polymer blend has a TD-value >260° C.

7. The miscible polymer blend of claim 1, wherein said polymer blend demonstrates a haze of <10% according to ASTM D 1003 in the non-pigmented state.

8. The miscible polymer blend of claim 1, wherein at least one of the said polymers of the blend has a molecular weight of >5,000.

9. A polymer composition, comprising:
   (i) 40–99 wt. % of a miscible polymer blend, said polymer blend comprising:
   (a) 1–99.9 wt. % of a first polymer comprising a poly-alpha-methylstyrene, said poly-alpha-methylstyrene consisting of at least 20 wt. % alpha-methylstyrene, 40–80 wt. % of a monomer having formula II

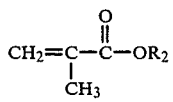

wherein $R_2$ is methyl, ethyl, propyl or n-butyl, and less than 0.1 wt. % of polar monomers;
   (b) 99–0.1 wt. % of a second polymer comprising at least 2 wt. % of a monomer having the formula I

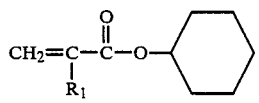

wherein $R_1$ is hydrogen or methyl, and at least 40 wt. % of at least one monomer having formula II; and
   (ii) 60–1 wt. % of a third polymer, wherein said third polymer is not compatible with said first polymer, said second polymer, or said polymer blend.

10. The polymer composition of claim 9, wherein said third polymer has a glass temperature of <20° C. and is at least partially covalently bonded with said first polymer or said second polymer.

* * * * *